United States Patent
Gern et al.

(10) Patent No.: US 7,424,364 B2
(45) Date of Patent: Sep. 9, 2008

(54) METHOD AND DEVICE FOR WARNING A DRIVER OF LANE DEPARTURE

(75) Inventors: Axel Gern, Leutenbach (DE); Rainer Moebus, Stuttgart (DE); Volker Oltmann, Altburger Strasse (DE); Bernd Woltermann, Fellbach (DE); Zoltan Zomotor, Stuttgart (DE)

(73) Assignee: Daimler AG, Stuttgrat (DE)

( * ) Notice: Subject to any disclaimer, the term of this patent is extended or adjusted under 35 U.S.C. 154(b) by 214 days.

(21) Appl. No.: 11/141,158

(22) Filed: May 31, 2005

(65) Prior Publication Data
US 2005/0273264 A1 Dec. 8, 2005

(30) Foreign Application Priority Data

Jun. 2, 2004 (DE) .................. 10 2004 027 030
Apr. 21, 2005 (DE) .................. 10 2005 018 697

(51) Int. Cl.
*G01C 21/26* (2006.01)
(52) U.S. Cl. .................. 701/301; 701/124; 701/23; 701/69; 701/70; 340/435; 340/436; 340/442
(58) Field of Classification Search .................. 701/301, 701/200; 340/435, 436, 903, 837
See application file for complete search history.

(56) References Cited

U.S. PATENT DOCUMENTS

| | | | | |
|---|---|---|---|---|
| 5,826,209 | A * | 10/1998 | Matsuno | 701/69 |
| 6,282,478 | B1 * | 8/2001 | Akita | 701/70 |
| 6,424,907 | B1 * | 7/2002 | Rieth et al. | 701/124 |
| 6,614,469 | B1 * | 9/2003 | Kato et al. | 348/148 |
| 6,812,883 | B2 | 11/2004 | Kumon et al. | 342/70 |
| 6,876,298 | B2 * | 4/2005 | Litkouhi et al. | 340/435 |
| 6,879,890 | B2 * | 4/2005 | Matsumoto et al. | 701/23 |
| 6,970,787 | B2 * | 11/2005 | Matsumoto et al. | 701/301 |
| 7,102,495 | B2 | 9/2006 | Mattes et al. | 340/435 |
| 7,107,137 | B2 * | 9/2006 | Tange et al. | 701/70 |
| 7,200,478 | B2 * | 4/2007 | Iwasaka et al. | 701/70 |

(Continued)

FOREIGN PATENT DOCUMENTS

DE    101 18 707    10/2002

(Continued)

*Primary Examiner*—Thomas G. Black
*Assistant Examiner*—Wae Louie
(74) *Attorney, Agent, or Firm*—Davidson, Davidson & Kappel, LLC

(57) ABSTRACT

A method and device for warning a driver of lane departure, wherein a first analyzer is used to detect the vehicle's lane departure based on image data and/or vehicle data and/or driver activity. The driver then receives a warning as a function of the detection by the first analyzer. In addition, a second analyzer for evaluating the driving situation is provided, which either performs the evaluation of the driving situation after the detection and via which the warning is suppressed as a function of the evaluation, or which alternatively performs an evaluation of the driving situation before the detection and via which a detection of lane departure is suppressed as a function of the evaluation. As a result, the driver receives highly reliable warnings of lane departure, and furthermore thanks to the evaluation of the driving situation erroneous warnings may be recognized highly reliably and as a result suppressed, so that the driver is not distracted unnecessarily and the product enjoys a high acceptance level among users.

25 Claims, 1 Drawing Sheet

U.S. PATENT DOCUMENTS

| | | | |
|---|---|---|---|
| 2003/0072471 A1* | 4/2003 | Otsuka et al. | 382/103 |
| 2005/0096827 A1* | 5/2005 | Sadano et al. | 701/70 |
| 2005/0096828 A1* | 5/2005 | Uemura et al. | 701/70 |
| 2005/0096829 A1* | 5/2005 | Sugano et al. | 701/70 |
| 2005/0107939 A1* | 5/2005 | Sadano et al. | 701/70 |
| 2006/0044119 A1* | 3/2006 | Egelhaaf | 340/425.5 |
| 2006/0220811 A1* | 10/2006 | Griesser et al. | 340/442 |
| 2007/0024430 A1* | 2/2007 | Ling et al. | 340/436 |
| 2007/0069874 A1* | 3/2007 | Huang et al. | 340/435 |

FOREIGN PATENT DOCUMENTS

| | | |
|---|---|---|
| DE | 103 11 518 | 11/2003 |
| DE | 102 54 247 | 6/2004 |
| DE | 10 2004 005104 | 8/2004 |
| DE | 103 49 211 | 5/2005 |
| DE | 10 2005 025386 | 4/2006 |
| WO | WO 2005/044652 | 5/2005 |
| WO | WO 2006/128502 | 12/2006 |

* cited by examiner

METHOD AND DEVICE FOR WARNING A DRIVER OF LANE DEPARTURE

METHOD AND DEVICE FOR WARNING A DRIVER OF LANE DEPARTURE

Priority is claimed to German Patent Application Nos. DE 10 2004 027 030.9, filed on Jun. 2, 2004, and DE 10 2005 018 697.1, filed on Apr. 21, 2005. The entire disclosure of both applications is incorporated by reference herein.

The present invention relates to a method and a device for warning a driver of lane departure.

BACKGROUND

Systems for warning a driver of imminent lane departure are known heretofore from the related art. Herein, systems of this kind usually have a suitable sensor system for lane recognition, and an analyzer for analyzing the crossing of lane markings, and a suitable means for warning the driver of lane departure as necessary. Driver assistance systems which actively intervene in driving dynamics are also known heretofore; however, driver assistance systems of this kind have hitherto been an exception, since the relevant statutory requirements only allow limited scope. Herein, the related-art driver assistance systems are as a general rule configured identically for every driver. In the future, it will be advantageous if driver assistance systems are adaptable to individual drivers' driving style, e.g., based on stored parameters. In particular in conjunction with a lane departure warning system, this would allow non-relevant warnings that unnecessarily distract the driver to be avoided.

DE 10311518A1 proposes a method and device for driver information or for reacting in the event of lane departure. Herein, the path of the lane markings is determined, the vehicle's anticipated path is determined, and possible lane departure is determined as a function thereof. Herein, future reactions by the driver are taken into account as part of the process of determining the vehicle's path. In particular, future corrections of the path by the driver, including his reaction times, are taken into account as part of the process of predicting the vehicle's future path. In addition, the driver's attentiveness level in the past is taken into account, and if the driver's past behavior suggests he is in an inattentive state the vehicle's future path is calculated based on a lesser change in curvature than if he were assumed to be in an attentive state.

DE 10254247A1 discloses a method for monitoring the driver of a motor vehicle, which functions on the basis of lane recognition. If, based on lane recognition, a critical driving situation is detected, the driver of the motor vehicle receives a warning. Herein, as part of the method, in addition to lane recognition the activity of the driver of the motor vehicle is determined, and the warning is suppressed or postponed for a predefined time period if it is determined that driver activity exceeds a predefined threshold value.

SUMMARY OF THE INVENTION

An object of the present invention is to provide a method and a device for warning a driver in the event of lane departure, which allows driving safety to be improved and at the same time the number of erroneous warnings to be minimized.

The present invention provides a method for warning a driver of lane departure, a first analyzer detecting lane departure by the vehicle based on image data and/or vehicle data and/or driver activity, and the driver being warned by the first analyzer as a function of the detection. In addition, a second analyzer for evaluating (2) the driving situation is provided, which either performs the evaluation (2) of the driving situation after the detection (1), suppression of the warning (B) being carried out as a function of the evaluation (2), or the evaluation (2) of the driving situation is performed before the detection (1), a detection (1) of lane departure being suppressed (E) as a function of the evaluation (2).

The present invention also provides a device for warning a driver of lane departure, including a first analyzer for detecting (1) lane departure by a vehicle based on image data and/or vehicle data and/or driver activity, the driver receiving a warning as a function of the detection (1) by the first analyzer. A second analyzer for evaluating (2) the driving situation is provided, which either performs an evaluation (2) of the driving situation after detection (1) with respect to signal flow and suppresses the warning as a function of the evaluation (2), or performs an evaluation (2) of the driving situation before detection (1) with respect to signal flow, detection (1) of lane departure being suppressed as a function of the evaluation (2).

According to the present invention, a method and a device for warning a driver in the event of lane departure are provided. Herein, a first analyzer is used to detect lane departure by the vehicle based on image data and/or vehicle data and/or driver activity. The driver then receives a warning as a function of the detection by the first analyzer. A second analyzer for evaluating the driving situation, which either performs the driving situation evaluation after detection and suppresses the warning as a function of the evaluation, or performs a driving situation evaluation before detection and suppresses detection of lane departure as a function of the evaluation, is provided, which constitutes an inventive step. This for the first time provides a highly reliable way to warn the driver of lane departure, and driving safety is significantly improved, because the driving situation is included in the analysis process. At the same time, because the driving situation is evaluated, erroneous warnings are recognized very reliably and then suppressed so that the vehicle driver is not unnecessarily distracted. The present invention therefore ensures that a method and device of this kind enjoy a high acceptance level among users.

Herein, in conjunction with the present invention the term 'various driving situations' should be understood to mean, for example, surrounding conditions, e.g., in the city center or towns and on interurban roads or expressways. This also includes prevailing weather conditions, times of day, types of road, or visibility conditions. The driving situation is also determined on the basis of road conditions, e.g., dry, wet, or icy. Moreover, the driving situation is also determined, for example, based on the number of other drivers in the vicinity of the vehicle and the distance between them and the driver's own vehicle. These and other parameters which define the driving situation are described in greater detail below.

If, during a predefined time period before analysis, driver activity is detected, the warning is suppressed, which constitutes a further inventive step. Based on driver activity it may be determined, for example, whether the driver is awake and alert. If, shortly before a lane departure or crossing of lane markings, driver activity is detected, it may be assumed on that basis that a deliberate driving maneuver by the driver is involved, e.g., an overtaking maneuver. In situations in which, for example, crossing the lane markings is deliberate, a warning to the driver would unnecessarily distract him from his actual task, and therefore the warning is advantageously suppressed in situations in which driver activity has been detected shortly before analysis. Herein, the predefined time period may be specified as a function of, for example, the driving speed, and may be in the range of a few seconds or less. Herein, driver activity may be determined, for example, based on the driver operating vehicle systems, the vehicle systems supplying a signal when operated. Driver activity may be determined based on operation of, for example, turn signal indicators, steering, accelerator pedal, clutch, gearshift, ACC systems, cruise control, radio, windshield wipers, or lights. Detection of driver activity may also be carried out by sensors monitoring the driver. Preferably, image-generating sensors such as CCD cameras or infra-red cameras are used for this, e.g., to detect the driver's head position, direction of gaze, eye movement, or blinking movements. In this context, the present invention is additionally advantageous in that the warning is not suppressed if, during the predefined time period before analysis, no driver activity is detected. Thus for safety reasons if, in the event of an imminent lane departure or crossing of lane markings, there is no driver activity, the driver receives a warning in all instances. This is, for example, true if the driver is alert yet no driver movement is detectable.

Warning is also not suppressed if, during the predefined time period, the driver is distracted from the task of assessing the driving situation, e.g., he is not watching the road or is obviously not paying attention and is in conversation with other people in the vehicle. Herein, the driver's level of attentiveness can be determined, for example, using an interior camera. The driver may also be distracted because he is operating devices and systems inside the vehicle, e.g., an on-board computer, the sound system, or the air conditioning. A warning is only issued if the event that distracts the driver occurs within a fixed predefined time period prior to the occurrence of the warning event. Otherwise the event is deemed to be an ordinary driver activity.

It is advantageously possible to specify the time period as a function of the type and/or degree of driver activity. Various types of driver activity have been described above, and may be used for specifying the time interval because of their relevance. For example, a distinction may be drawn between whether the vehicle is accelerating or being braked, and the time period may be specified as longer or shorter as a function thereof. Herein, the degree of driver activity is also taken into account, the time period being specified, for example, as a function of how firmly the brakes are applied or the pressure on the accelerator pedal. Herein, in conjunction with the present invention it has proved particularly advantageous to specify a longer time period if there is a greater degree of driver activity, thus ensuring that issuing of warnings to the driver is reliable. In connection with the present invention, 'a greater degree of driver activity' should be understood to also mean a combination of a plurality of different driver activities.

In a further advantageous embodiment of the present invention, the time period is specified as a function of the vehicle's speed and/or its speed relative to other vehicles. Herein, it has proved particularly advantageous to specify a shorter time interval with an increasing vehicle speed. Herein, time periods may be assigned to speeds in a linear manner for example, or a given time period may be assigned to a range of speeds, for example a given parameter set having time data for a time period may be assigned to the 60-110 km/h range, and another parameter set may be assigned to the 111-180 km/h range.

Furthermore, it is advantageous that it is possible to specify the time period as a function of lane markings detected and/or lane width. In the case of lane markings detected, distinctions may be drawn, for example, between continuous, broken-line, thick, thin, or double lane markings, etc. Herein, the type of lane marking provides an indication of the prevailing driving situation, and enables the time period to be specified based on the driving situation. For example, based on the lane markings a distinction may be drawn between whether the vehicle is in city traffic or on a highway, and a suitable time period may be specified on that basis. It is also possible in this connection to determine the lane width; as a general rule, if the lane is narrow a shorter time period is specified than for a wider lane, since in narrower lanes there is a greater danger of lane departure or of crossing lane markings.

Another advantageous way to specify the time period based on the driving situation is as a function of surrounding conditions and/or the time of day. Surrounding conditions such as rain, dryness, fog, snow, and ice affect the traffic situation and the driving conditions; visibility and driver reaction time may be limited. Herein, the time of day has a significant impact on visibility, and the danger of a lane departure in particular is greater in the dark. If, due to the surrounding conditions, it is necessary to drive slowly, or visibility is poor, it is advantageous in particular that a shorter time period may be specified, and if the visibility is better a longer time period may be specified.

It is also advantageously possible to specify the time period as a function of the type of road and/or as a function of map information. Depending on the type of road, lane width and the speed limit may vary considerably. Herein, the possible types of road are, for example, city center roads, roads with traffic calming, roads in residential areas, major highways, and expressways. Herein, the type of road is a significant parameter for defining the driving situation. Herein, different types of road may be determined not just from lane markings but also, for example, from captured images of other surrounding information such as road signs or direct measurement of the lane width using suitable sensors. Another option for determining the driving situation is to use map information, as electronic maps may include, for example, data regarding the particular type of road. Herein, it is also feasible that in the case of specific stretches of road suitable time periods may be included in the map data in question.

It is also advantageously possible to specify the time period as a function of objects in the vicinity of the vehicle. Herein, it has, for example, proved advantageous that the approach speed at which the vehicle is approaching other vehicles may be used as the basis for specifying the time period for the analysis of driver activity. Herein, the data regarding the approach speed is preferably captured using a radar sensor, camera, lidar sensor, or any other sensors provided in the vehicle for the purpose of monitoring the surrounding area. Thus in connection with the method according to the present invention it is particularly advantageous that it is possible, based on a rapid approach towards another vehicle, to distinguish between intentionally pulling out to overtake and inadvertent lane departure e.g., due to inattentiveness. If pulling out is deliberate, a warning is suppressed. Herein, the time period may be specified not only as a function of vehicles in front but also as a function of objects that are adjacent or behind. Nevertheless, as a general rule for safety reasons warnings or detections are not suppressed if objects are located next to the driver's own vehicle.

Furthermore, as part of the method according to the present invention the time period may also be specified as a function of a driver type classification. Herein, it is, for example, possible to draw rough distinctions between sporty and less sporty drivers. Herein, in the case of sporty drivers preferably a shorter time period is specified than for less sporty drivers. However, it is equally possible to specify an individual time period for each driver. To accomplish this, it is possible, for example, for past driver activity to be taken into account or the number of past lane crossings to be analyzed. The time period may also be specified as a function of a length of time since a previous warning, this being particularly advantageous. Herein, it is advantageous if the shorter the time elapsed since a previous warning, the shorter the time period specified. It is particularly advantageous that the aforementioned criteria are not applied independently of one another when a suitable time period is specified, but rather any combination thereof is feasible, this being advantageous.

In a further advantageous embodiment of the present invention, the warning is suppressed if, during the specified time period, there has been an intervention by the Electronic Stability Program (ESP). The driver has already been alerted by the intervention by the ESP system, and herein an additional warning would merely distract the driver in a dangerous situation. Intervention by the ESP system provides the driver with adequate warning, in particular via a visual display means on the instrument panel. Herein, acoustic and haptic warning means may also be used in addition to the visual warning means in conjunction with the present invention.

It is also advantageous to suppress the warning if the vehicle speed lies outside a predefined speed range. Herein, in conjunction with passenger vehicle applications a predefined speed range of 60 km/h to 180 km/h has proved suitable, warnings being suppressed at speeds outside this range. At speeds of over 180 km/h the driver must in any case be very attentive and at speeds below 60 km/h there might otherwise be a large number of unnecessary erroneous warnings in certain driving situations, e.g., when parking in a city center. Herein, it is particularly advantageous if a switching hysteresis is implemented for the speed range specification, in particular the switch-off speed being below the switch-on speed. In passenger vehicle applications, the switch-off speed is therefore 55 km/h, while the switch-on speed is 60 km/h. In other applications such as commercial vehicles or self-contained transport vehicles lower speeds are used in an analogous manner.

The warning may also be advantageously suppressed if the angle between the vehicle's direction of travel and the path of the lane and/or the steering angle exceeds a specified value. Slight differences between the vehicle's direction of travel and the path of the lane may be the result of, for example, slight avoidance maneuvers due to gusts of wind or road unevenness. To allow driver warnings in such situations, a threshold value may be predefined for the angle between the direction of travel and the actual path of the lane and/or the steering angle. If a threshold value of for example 3° is exceeded, no warning is issued. Herein, it is also possible for the threshold value to vary as a function of the vehicle's speed, e.g., a threshold value of 5° at low speed and 3° at high speed. Suppressing the warning when a predefined angle between the path of the lane and the actual direction of travel is exceeded or when a predefined steering angle is exceeded allows unnecessary warnings to be avoided.

Furthermore, if, after a warning has been issued, the vehicle moves towards the middle of the lane within a predefined time period and herein is not less than a predefined distance from the middle of the lane, warning is suppressed. Thus between two warnings, or between one warning and a warning suppressed based on warning suppression criteria, in order for a further warning to be issued the vehicle must be moving forward close to the middle of the lane, at least for a short time. Herein, the necessary proximity to the middle of the lane is defined by a predefined distance termed the 'vehicle offset'. Otherwise, in particular when driving along lane markings, the vehicle might cross the lane markings a number of times, making it necessary to unnecessarily warn the driver a number of times despite his being in an attentive state. While it is true that there are not many drivers whose driving style means they basically drive along the lane markings, nonetheless in certain driving situations, e.g., on an expressway, it might be necessary to drive directly along the lane markings, e.g., to allow one to see past a vehicle in front and thus safely determine the driving situation in front.

It has also proved advantageous to suppress the warning if the vehicle is on an on-ramp or exit lane and receives instructions from a dynamic route guidance system to drive along it. On-ramps and exit lanes often have lane markings which would result in unnecessary warnings if they were driven across. As the route guidance system has determined that the lane and accompanying lane markings are drivable, it is unnecessary to issue a further warning when the driver accepts the proposed route. Herein, intersections, on-ramps, and exit lanes may be safely detected using image-generating sensors.

The warning is also suppressed if a plurality of lane markings are detected within a predefined lane width. This is in particular the case in special driving situations, e.g., construction areas or areas where traffic flow has been modified. It has also proved advantageous for the warning to be suppressed if the vehicle negotiates an S-bend. In particular in connection with S-bends where there is a broken central line, drivers tend to cut the curves and thereby depart from their own lane for a short time. In such a driving situation a warning would merely unnecessarily distract the driver.

In towns, there is often a large number of lane markings, and moreover the driver is usually very attentive due to the special driving situation in towns, there being as a general rule a number of other vehicles or pedestrians in the immediate vicinity of the vehicle, and it has therefore proved advantageous to suppress warnings if the vehicle is in a built-up area. Herein, towns may be recognized as such based on, for example, analysis of captured images of signs showing the name of the town or other specific road signs that only occur in towns. Data regarding towns taken from map data may also be used.

Furthermore, the warning is suppressed if no suitable lane information is present or the quality of image-based lane recognition is below a predefined threshold. Herein, a digital map may also indicate whether the road along which the vehicle is currently traveling has any lane markings, e.g., small country roads or unpaved tracks may not have any lane markings. Moreover, a threshold value is predefinable for the minimum quality required for image-based recognition of lane information. Only lane information which is of the minimum quality based on the threshold value is used in the analysis. Herein, quality may be specified as a function of lane information, e.g., as a function of the type of lane information, continuous lane markings being evaluated differently from broken-line lane markings. Evaluation may also be based on position, e.g., if lane information to the vehicle's left is more difficult to recognize than lane information to the right, in this case only the lane markings on the vehicle's right are used in the analysis.

It is also advantageous that a warning is not issued and detection is not performed if the driver switches to an adjacent lane and in doing so crosses a broken-line lane marking. Crossing a broken-line lane marking is basically permitted if in doing so the driver switches to an adjacent lane. Herein, this may involve, for example, a parallel lane in the same direction of travel or a lane in the opposite direction of travel, the driver using the lane for a short time only, e.g., when overtaking.

Nevertheless, a warning is issued in all instances if the driver drives into the adjacent lane as part of a steering activity and then threatens to depart that lane. It is advantageous that a warning is issued and detection is not suppressed if the driver performs a double change of lane, thereby crossing two broken-line lane markings in succession and in doing so performing no or only slight steering activity. Herein, no warning is issued after the driver crosses the first lane marking, but at that instant a time period is activated and if that time period has not elapsed at the time the vehicle reaches the second lane marking, a warning is issued in all instances. Thus a warning is issued in all instances in the case of a double lane change where no activity is detected in the middle lane.

Moreover, a warning is issued and detection is not suppressed if the driver, having crossed a continuous lane marking on a curve, does not perform sufficient steering activity within a predefined time period to return to the lane. Herein, the curvature of the curve is taken into account in the analysis; herein, the curvature may be determined using for example image-generating sensors. After the driver has crossed a continuous line on a curve, initially no warning is issued. However, if the driver does not steer back in the direction of the lane within a time period specified based on the curvature, and herein the steering angle is insufficient, a warning is issued in all instances. This provides the driver with a reliable warning if the steering he is performing is insufficient.

BRIEF DESCRIPTION OF THE DRAWINGS

A description of preferred exemplary embodiments, indicating further features and advantages of the present invention, is provided below with reference to the drawings, in which.

DETAILED DESCRIPTION

Figure 1:
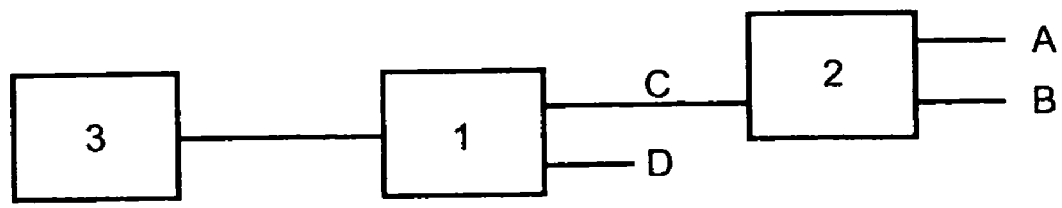
FIG. 1 schematically shows the device, evaluation of the driving situation being carried out after detection.

By way of example; the device according to the present invention is schematically shown in FIG. 1, evaluation (2) of the driving situation being carried out after detection (1). For example, herein data is captured by at least one sensor unit (3), e.g., image data from the vicinity of the vehicle, vehicle data, or driver activity data. This data is sent to a first analyzer (AW1), which then performs a detection (1) of lane departure based on the sensor data. If lane departure is not detected, a signal is present at output (D), based on which no warning is issued. If lane departure is detected, a warning signal is instead present at output (C), which is connected to the input of a second analyzer (AW2). Herein, an evaluation (2) of the driving situation is performed by AW2. Then, as a function of the driving situation, a warning is issued (A) or the warning is suppressed (B).

Figure 2:
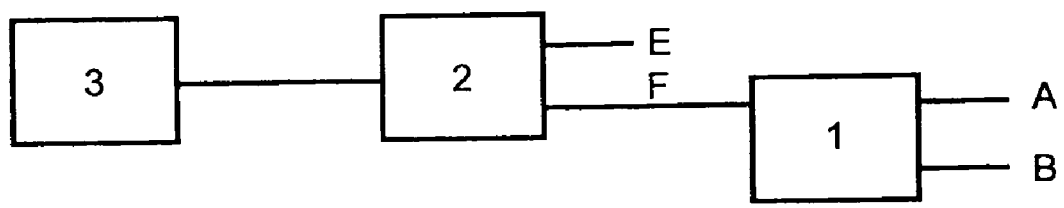
FIG. 2 schematically shows the device, evaluation of the driving situation being carried out before detection.

By way of example the device according to the present invention is schematically shown in FIG. 2, evaluation of the driving situation being carried out before detection. Herein, data is captured by at least one sensor unit (3), e.g., image data from the vicinity of the vehicle, vehicle data, or driver activity data. This data is first sent to a second analyzer (AW2), and first an evaluation (2) of the driving situation is performed by AW2 and then, as a function of the evaluation (2) of the driving situation, a detection (1) is suppressed (E) or a detection (1) is performed (F). If a detection is performed (F), a warning is issued (A) or the warning is suppressed (B) as a function of detection (1).

What is claimed is:

1. A method for warning a driver of a vehicle of lane departure, the method comprising:
   detecting lane departure by the vehicle using a first analyzer based on at least one of image data, vehicle data, and driver activity;
   issuing a warning to the driver as a function of the detection using the first analyzer;
   evaluating a driving situation using a second analyzer before or after the detecting, wherein when the evaluating is performed after the detecting, the second analyzer carries out a suppression of the warning as a function of the evaluation, and wherein when the evaluating is performed before the detecting, the second analyzer suppresses a detection of lane departure as a function of the evaluation.

2. The method as recited in claim 1, further comprising detecting for driver activity and wherein the warning or detection is suppressed if driver activity is detected during a predefined time period prior to the evaluating.

3. The method as recited in claim 2, further comprising specifying the predetermined time period as a function of one of a type and a degree of driver activity.

4. The method as recited in claim 2, further comprising specifying the predetermined time period as a function of one of a vehicle speed and a relative vehicle speed relative to other vehicles.

5. The method as recited in claim 2, further comprising specifying the predetermined time period as a function of one of detected lane markings and a lane width.

6. The method as recited in claim 2, further comprising specifying the predetermined time period as a function of one of a surrounding condition and a time of day.

7. The method as recited in claim 2, further comprising specifying the predetermined time period as a function of one of a type of road and a map data.

8. The method as recited in claim 2, further comprising specifying the predetermined time period as a function of an object located in the vicinity of the vehicle.

9. The method as recited in claim 2, further comprising specifying the predetermined time period as a function of a driver type classification.

10. The method as recited in claim 2, further comprising specifying the predetermined time period as a function of an elapsed time since a previous warning.

11. The method as recited in claim 1, wherein the warning or detection is suppressed if a specified length of time has not elapsed since an intervention by an Electronic Stability Program (ESP).

12. The method as recited in claim 1, wherein the warning or detection is suppressed if the vehicle speed is outside a predefined speed range.

13. The method as recited in claim 1, further comprising detecting for driver activity and wherein the warning or detection is not suppressed if no driver activity is detected during a predefined time period prior to the evaluating.

14. The method as recited in claim 13, wherein the warning or detection is not suppressed if the driver is distracted from the task of assessing the driving situation during the predetermined time period.

15. The method as recited in claim 1, wherein the warning or detection is suppressed if an angle between the vehicle's direction of travel and one of the path of the lane and the steering angle exceeds a predefined value.

16. The method as recited in claim 1, further comprising suppressing the warning or detection if, following a warning or a suppressed warning or detection, the vehicle moves towards the middle of the lane and is not less than a predefined distance from the middle of the lane.

17. The method as recited in claim 1, wherein the warning or detection is suppressed if the vehicle is in the vicinity of a bifurcation and receives instructions from a route guidance system to modify the direction of travel at the bifurcation.

18. The method as recited in claim 1, wherein the warning or detection is suppressed if a plurality of lane markings is detected within a predefined lane width.

19. The method as recited in claim 1, wherein the warning or detection is suppressed if the vehicle is negotiating an S-bend.

20. The method as recited in claim 1, wherein the warning or detection is suppressed if the vehicle is in a built-up area.

21. The method as recited in claim 1, wherein the warning or detection is suppressed if suitable lane information is not available or the quality of image-based lane recognition is below a predefined threshold value.

22. The method as recited in claim 1, wherein the warning or detection is not performed if the driver switches to an adjacent lane and herein crosses a broken-line lane marking.

23. The method as recited in claim 1, wherein the warning or detection is not suppressed if the driver performs a double change of lane, thereby crossing two broken-line lane markings in succession and without performing substantial steering activity therebetween.

24. The method as recited in claim 1, wherein the warning or detection is not suppressed if the driver does not perform sufficient steering activity within a predefined time period to return to the lane after having crossed a continuous lane marking on a curve.

25. A device for warning a driver of a vehicle of lane departure, comprising:
- a first analyzer configured to detect lane departure by a vehicle based on at least one of image data, vehicle data, and driver activity, and to issue a warning to the driver as a function of the detection;
- a second analyzer configured to perform an evaluation of a driving situation of the vehicle before or after the detection, and wherein the second analyzer is configured to suppress the warning as a function of the evaluation when the evaluation is performed after the detection and wherein the second analyzer is configured to suppress the detection as a function of the evaluation when the evaluation is performed before the detection.

* * * * *